April 14, 1936. H. B. HULL 2,037,417
REFRIGERATING APPARATUS
Filed June 30, 1930 2 Sheets-Sheet 1

INVENTOR
Harry B Hull
BY Spencer, Hardman and Fehr
ATTORNEY

April 14, 1936.  H. B. HULL  2,037,417

REFRIGERATING APPARATUS

Filed June 30, 1930  2 Sheets-Sheet 2

INVENTOR
Harry B Hull
BY Spencer, Hardman and Fehr
ATTORNEY

Patented Apr. 14, 1936

2,037,417

UNITED STATES PATENT OFFICE 2,037,417

REFRIGERATING APPARATUS

Harry B. Hull, Dayton, Ohio, assignor, by mesne assignments, to General Motors Corporation, a corporation of Delaware Application June 30, 1930, Serial No. 465,020

17 Claims. (Cl. 62—108.5)

This invention relates to refrigerating apparatus and more particularly to the type of apparatus adapted for household use, having means for freezing the so-called ice cubes from water or comestibles which are placed in trays, the trays being received by the cooling unit in the refrigerator cabinet.

One of the objects of the invention is to provide improved means and method for releasing the so-called ice cubes from the trays or molds in which they are frozen.

Another object of the present invention is to break the bond between the ice cubes and the mold therefor by utilizing pressure created by a chilling action after the cubes are formed.

More specifically it is an object of the invention to provide for releasing a frozen liquid from the mold in which it has been frozen by freezing a liquid portion so as to create a pressure below the frozen portion and utilize this pressure to break the bond between the frozen portion and the mold.

Further objects and advantages of the present invention will be apparent from the following description, reference being had to the accompanying drawings, wherein several preferred forms of the present invention are more clearly shown.

Figure 1:
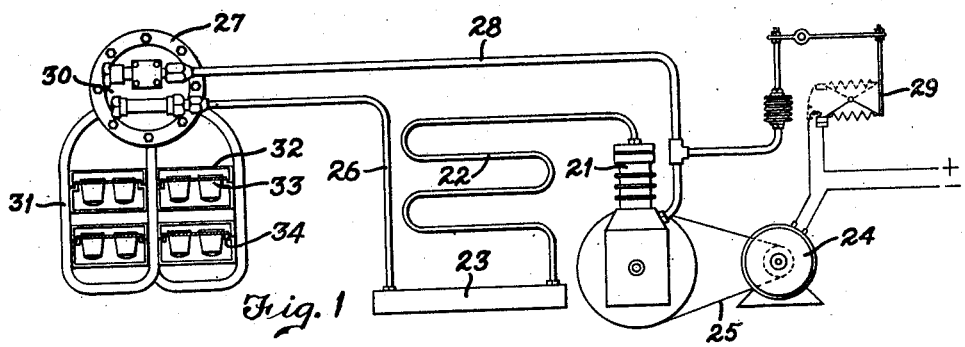
Fig. 1 is a front view of a cooling unit showing the ice trays in cross-section together with a diagrammatic representation of the remainder of a refrigeration system.
Figure 2:
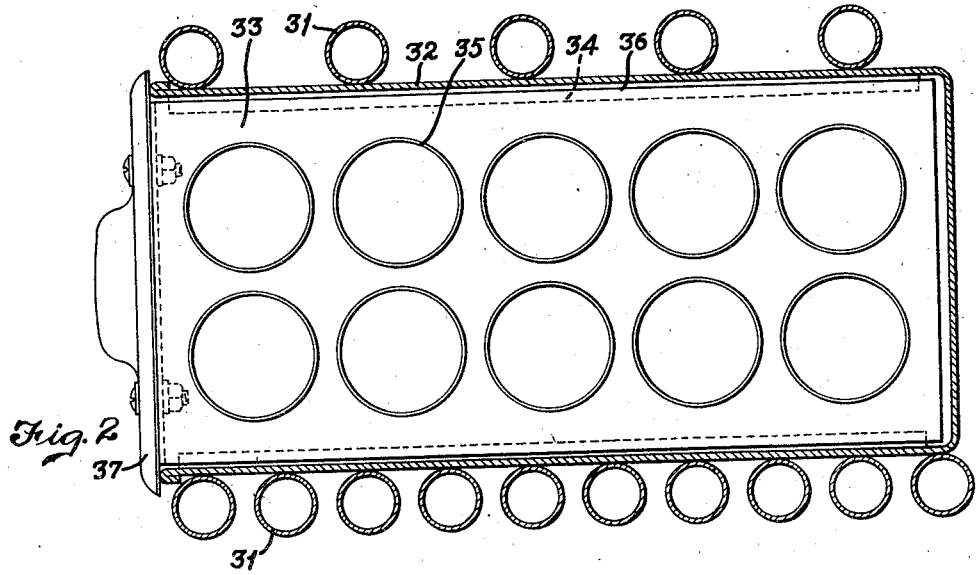
Fig. 2 is a horizontal cross-sectional view of a portion of the cooling unit showing an ice tray.

In Fig. 1 for illustration purposes there is shown diagrammatically a compressor 21 for compressing the refrigerant, preferably sulphur dioxide, and for forwarding it to the condenser 22 where it is liquefied and collected in the receiver 23. The actuating means for the compressor preferably comprises a motor 24, connected by pulley and belt means 25 to the compressor. A supply conduit 26 supplies liquid refrigerant to the evaporator or cooling unit 27 where the liquid refrigerant vaporizes because of the absorption of heat and is returned to the compressor through the return conduit 28. A pressure responsive switch means 29 is preferably connected in the return conduit 28 for controlling the motor 24 to provide alternating operating and idle periods of the compressor according to the pressure and consequently the temperature of the evaporator.

Figure 6:
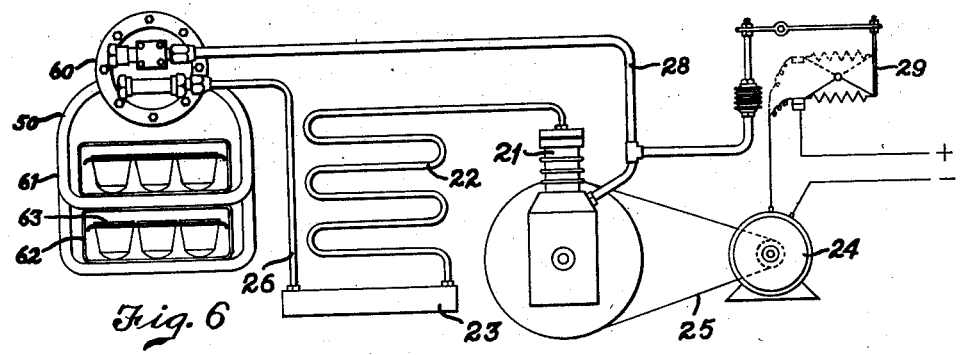
Fig. 6 is a front view of another form of cooling unit showing the trays in cross-section together with a diagrammatic representation of the remainder of a refrigeration system similar to that of Fig. 1.
Figure 7:
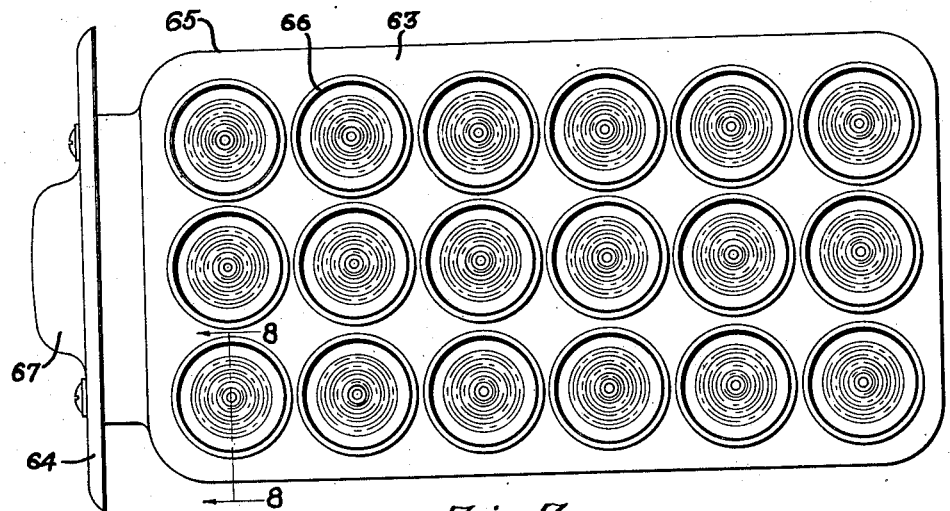
Fig. 7 is a plan view of a form of an ice tray shown in Fig. 6.

A refrigerating system of the same type as shown in Fig. 1 is disclosed in Fig. 6 with a slightly modified form of evaporator 50.

One of the preferred types of evaporators for carrying out applicant's principle of invention comprises a boiler portion 30 and depending refrigerating ducts or coils 31, which in the preferred type illustrated in Fig. 1 are in two banks or series, but which may be grouped into one or more banks as desired. Within the enclosure formed by the banks of the refrigerating ducts or coils 31 are the sleeves or compartments 32, the sides of which are soldered or secured in any suitable manner to the refrigerating ducts or coils.

One of the methods by which applicant's broad principle of invention may be accomplished is to freeze the contents of an ice tray from the top downward, the freezing of the bottom portion taking place last. The sleeves or compartments 32 contain the ice trays 33 and, in order to provide for removal of the trays, each of the compartments 32 has its front end open and is provided with a pair of tray-supporting brackets 34 which are placed relatively high on the long sides of the compartment so that the ice trays 33 may be supported a sufficient distance from the bottom of the compartment so as to prevent a substantial amount of heat, to be removed through the bottom portion of the ice tray, from the water or comestibles to be frozen.

Figures 3, 4, 5:
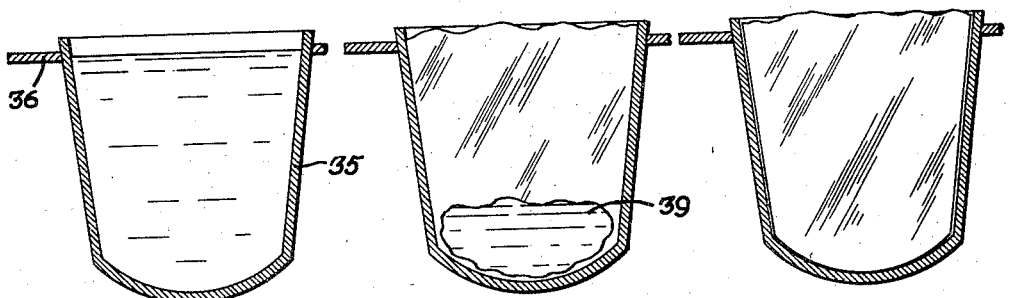
Fig. 3 is a cross-sectional view through a portion of the ice tray disclosing a mold or form filled with a liquid.
Fig. 4 is a cross-sectional view similar to that of Fig. 3 after freezing has begun.
Fig. 5 is a cross-sectional view similar to that of Figs. 3 and 4 after freezing has been completed.

Each of the ice trays in this preferred embodiment has a metal sheet or thin plate 36 having a plurality of perforations therein for receiving and supporting the ice-making molds or forms 35 which are made of a metal having a medium heat conductivity such as Monel. These ice-making molds or forms in the present instance are of a tapered cup-like shape having their side walls converging downwardly and fit in the apertures of the sheet or plate 36 in such a manner that the contact between the sheet or plate and the mold or form is made near the top or rim of such mold or form as shown in Fig. 3. For the purpose of covering the front end of each of the compartments 32 a metal tray front 37 is attached to the sheet or plate 36 of each tray and provided with a handle for convenient removal of the tray.

When liquids are frozen in this type of tray, the liquids will be frozen from the top downward as shown in Fig. 4, by virtue of the fact that thermal contact is made between the sheet or plate 36 and the ice-making molds or forms of each tray close to the rim of such molds or forms, and because the thermal contact of the sheet or plate portion of each tray with its compartment enables the heat to be transmitted to the refrigerating ducts or coils from the top portion of the water or comestible to be frozen by reason of the contact of each compartment with the refrigerating ducts or coils.

When freezing in this manner a quantity of the unfrozen liquid 39 (Fig. 4) will be trapped between the solid ice or frozen liquid in the upper portion of the mold or form and the bottom of the mold or form. As this quantity of liquid freezes, the expansion thereof will force the rest of the so-called "ice cube" upwardly, thereby breaking the "cube" loose from the side walls of the mold or form as shown in Fig. 5. When the cube is broken loose from the side walls of the mold or form it may be easily removed.

In the refrigerating apparatus shown in Figs. 6 to 9 another embodiment of applicant's broad principle of invention is incorporated, the system differing only in the form of the evaporator 50 and the ice trays.

The preferred type of evaporator 50 of the embodiment of the invention shown in Figs. 6 to 9 comprises a boiler portion 60 and depending refrigerating ducts or coils 61 which in the preferred type illustrated in Fig. 1 are in two banks, but which may be grouped into one or more banks as desired. Within the enclosure formed by the banks of the refrigerating ducts or coils 61 are the sleeves or compartments 62 which are soldered or secured in any suitable manner to the refrigerating ducts or coils.

The sleeves or compartments 62 contain the ice trays 63 which rest upon the bottom of the compartments and which are provided with tray fronts 64 which cover the open end of the compartments when the ice trays are in place within the compartments. Each of the ice trays in the preferred embodiment has a frame consisting of metal sheet or thin plate 65 having a plurality of perforations therein for receiving and supporting the ice-making molds or forms 66. The tray fronts 64 are bolted or otherwise secured to the front end of the metal sheet or thin plate 65 and are provided with a handle 67 for convenient removal.

Figure 8:
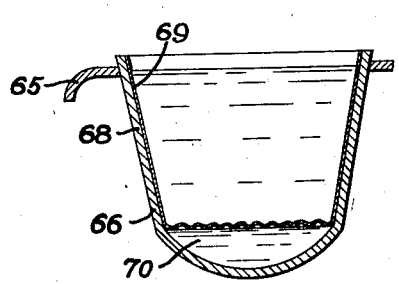
Fig. 8 is a cross-sectional view along the line 8—8 of Fig. 7 through a portion of the ice tray disclosing a mold or form filled with a liquid.
Figure 9:
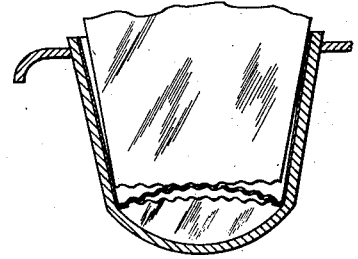
Fig. 9 is a cross-sectional view similar to that of Fig. 8 after freezing has taken place and the "ice block" has been released from its mold.

In this preferred embodiment each of the molds or forms 66 (Figs. 7, 8 and 9) are fitted within the apertures in the sheet metal or thin plate 65 and are composed of a pair of cup-shaped members, one of which is seated within the other as is most clearly shown in Figs. 8 and 9. The outer cup-shaped member 68 has tapered sides or sides converging downwardly to a convex round bottom and is preferably made of comparatively heavy sheet metal while the inner cup-shaped member 69 is preferably made of thin sheet metal, has a generally flat corrugated bottom which forms a diaphragm having a snap action but has tapered sides similar to the outer cup 68. In the enclosure between the bottoms of the two cups is placed preferably a liquid 70 having a lower freezing point than water such as a brine in order to insure the freezing of this liquid after the "ice cubes" have been frozen.

The liquid to be frozen is poured into the mold or form 66 and since it has a higher freezing point than the liquid 70 enclosed within the double bottom of the mold or form, the liquid to be frozen will be frozen first when the ice tray 63 is put into its compartment in the refrigerator and later, when the tray becomes cooler, and the freezing point of the liquid 70 is reached, the liquid 70 will freeze and expand, forcing itself against the lower side of the corrugated bottom or diaphragm of the inner cup 69 deforming it in an upward direction, causing it to snap upwardly, and thereby forcing the so-called "ice cube" or frozen liquid upwardly and breaking its bond with the side walls of the mold as is shown in Fig. 9. Thus the walls enclosing the liquid 70 and the liquid 70 itself form a temperature responsive motor for breaking the ice bond between the frozen liquid and the walls of the mold. This enables the "ice cube" to be conveniently and easily removed without any application of heat to the ice tray.

While the several forms of embodiment of the invention as herein disclosed, constitute preferred forms, it is to be understood that other forms might be adopted, all coming within the scope of the claims which follow.

What is claimed is as follows:

1. Freezing apparatus including a sheet member having an aperture therein, a mold adapted to contain the liquid to be frozen, said mold being seated within said aperture and contacting near the top of its sides with the sheet member, freezing coils surrounding said sheet member, and means contacting with said freezing coils and said sheet member for conducting heat from the mold to the freezing coils, said mold being supported otherwise out of thermal contact with said freezing coils so that said liquid to be frozen freezes from the top downwardly.

2. A mold adapted to contain a liquid to be frozen, said mold having a flexible bottom and means responsive to temperatures below 32° F. for pushing the flexible bottom upward.

3. A mold adapted to contain a liquid to be frozen, said mold having a flexible bottom, and temperature responsive means immediately beneath the flexible bottom for pushing the flexible bottom upward.

4. A mold adapted to contain a liquid to be frozen, said mold having a flexible bottom, a second liquid enclosed immediately below said flexible bottom.

5. Freezing apparatus for liquids including a mold adapted to contain liquid to be frozen, said mold having a double bottom, one of said bottoms being flexible and having liquid contained within said double bottom.

6. Freezing apparatus for liquids including a mold adapted to contain liquid to be frozen, said mold having a double bottom, one of said bottoms being corrugated and liquid contained within said double bottom.

7. In freezing apparatus for liquids, a vessel having a curved bottom, a second vessel fitting within said first vessel and having a generally flat flexible bottom, and a solution contained between the two bottoms.

8. In freezing apparatus for liquids, a vessel having a curved bottom, a second vessel fitting within said first vessel and having a generally flat flexible corrugated bottom, and a liquid contained between the two bottoms.

9. Freezing apparatus including a mold to be placed in intimate thermal association with a cooling unit of a refrigerating system and adapted to contain a substance to be frozen, said mold being formed of a material whose heat conductivity is low, the walls of said mold converging downwardly when the mold is positioned in operative relation with the cooling unit, and means for removing heat from the upper portion of the mold to freeze the substance therein from the top downwardly and for preventing heat from being removed from the lower portion of the mold with any rapidity.

10. Freezing apparatus including a mold to be placed in intimate thermal association with a cooling unit of a refrigerating system and adapted to contain a substance to be frozen, said mold being formed of a material whose heat conductivity is low, the walls of said mold converging downwardly when the mold is positioned in operative relation with the cooling unit, and means for freezing the substance in the mold from the top downwardly and for causing the bond between the frozen substance and the side walls of the mold to be broken.

11. A mold adapted to contain a substance to be congealed or frozen, said mold having a flexible bottom, and temperature responsive means for moving the flexible bottom after the substance in the mold has been congealed or frozen.

12. A mold including integral wall portions arranged to form a downwardly converging open top chamber adapted to contain a substance to be congealed or frozen, certain integral wall portions of said mold being movable relative to other wall portions thereof, and temperature responsive means for moving the movable wall portion of said mold.

13. A mold adapted to contain a substance to be congealed or frozen, said mold having a double bottom wall, one wall of said double bottom wall being movable relative to the other wall thereof, and temperature responsive means for moving the movable wall of said double bottom wall after the substance in the mold has been congealed or frozen.

14. A mold including a plurality of wall portions arranged to form an open top chamber adapted to contain a substance to be congealed or frozen, at least one wall of said mold being movable relative to other wall portions thereof, and a temperature responsive motor for moving the movable wall of said mold.

15. A cooling device comprising in combination, a cooling element, a shelf supported by said cooling element, means to thermally associate a substance with said shelf to be cooled by said cooling element and temperature responsive means for moving the substance upwardly relatively to the shelf after the substance has been frozen.

16. In combination, a mold adapted to contain a liquid to be frozen, said mold having a flexible wall portion, and means separate from the liquid in said mold and responsive to temperatures below 32° F. for moving the flexible wall portion of the mold.

17. In combination, a plurality of wall portions arranged to form an open top mold adapted to contain a substance to be frozen, at least one wall of said mold being movable relative to other wall portions thereof, and temperature responsive means for moving the movable wall of said mold.

HARRY B. HULL.